Figure 1:
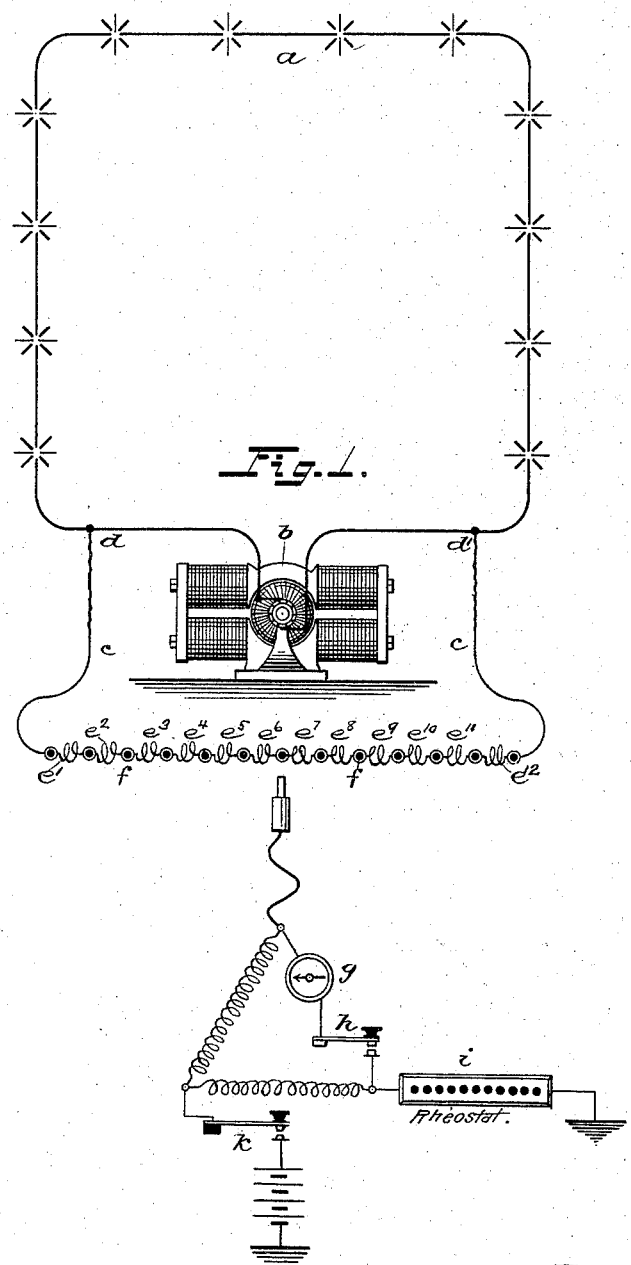

(No Model.)　　　　　　　　　　　　　　　2 Sheets—Sheet 1.
C. H. RUDD.
SYSTEM OF TESTING ELECTRIC CIRCUITS.

No. 476,317.　　　　　　　　　　Patented June 7, 1892.

(No Model.) 2 Sheets—Sheet 2.

C. H. RUDD.
SYSTEM OF TESTING ELECTRIC CIRCUITS.

No. 476,317. Patented June 7, 1892.

Witnesses.
Charles G. Hawley.
Geo. R. Parker.

Inventor.
Charles H. Rudd.
By George P. Barton
Attorney.

THE NORRIS PETERS CO., PHOTO-LITHO., WASHINGTON, D. C.

UNITED STATES PATENT OFFICE.

CHARLES H. RUDD, OF CHICAGO, ILLINOIS, ASSIGNOR TO THE WESTERN ELECTRIC COMPANY, OF SAME PLACE.

SYSTEM OF TESTING ELECTRIC CIRCUITS.

SPECIFICATION forming part of Letters Patent No. 476,317, dated June 7, 1892.

Application filed November 4, 1889. Serial No. 329,129. (No model.)

*To all whom it may concern:*

Be it known that I, CHARLES H. RUDD, a citizen of the United States, residing at Chicago, in the county of Cook and State of Illinois, have invented a certain new and useful Improvement in Measuring Insulation Resistances of Live Metallic Circuits, (Case No. 10,) of which the following is a full, clear, concise, and exact description, reference being had to the accompanying drawings, forming a part of this specification.

My invention relates to testing electric circuits to determine whether there are any accidental connections to ground thereon or any weak places in the insulation thereof liable to cause trouble, the testing being done without withdrawing the circuits tested from use. Thus, for example, in systems of arc lighting a connection to ground at one point on a circuit is a source of danger, since, as is well known, if a second ground is formed at another part of the circuit the portion of the circuit between the two grounds becomes inoperative. A circuit having a ground at one point is especially dangerous to life, since one taking hold of the same circuit at a distance might complete a second ground connection through his own body, as has too frequently happened of late. It is well known that one may by means of a Wheatstone-bridge testing set applied at the center of resistance of a line-circuit determine in ohms the insulation resistance of such line-circuit without disturbance or interference from the working current traversing the circuit. It is evident that the difficulties in the way in finding such neutral point would always be great and often insurmountable, and hence such method of testing has not been adopted, practically, to my knowledge, though its theoretical practicability has long been well understood. In searching to remove the practicable difficulties in the way of testing at the neutral point I have discovered that an artificial circuit may be provided at the lighting-station, adapted to be connected with any line-circuit, the resistance of this artificial circuit being made very high and of a fixed and invariable amount and the resistance being so apportioned or divided between the contact-points or socket connections that the attendant by means of his testing set may find the neutral point in the artificial circuit corresponding to the neutral point of the line-circuit connected therewith. This corresponding neutral point having been determined, the desired tests and measurements may be made at this neutral point in the artificial circuit. In this manner the necessity of searching out the neutral point upon the exterior circuit is avoided—that is to say, the tests may be made at the proper point of the artificial circuit, which of course is placed within the office at the lighting-station, so as to be readily accessible. If the insulation of a circuit be perfect, its electrostatic neutral point will be its center of actual resistance. If the insulation of a circuit is defective and the defects uniformly distributed, the electrostatic neutral point will still remain at the center of actual resistance; but if the defective insulation be not evenly distributed, the location of the neutral points will be varied accordingly as the defects in insulation are greater or less upon one side or the other of the actual center of resistance. Thus while the theoretical neutral point might be readily determined once for all, yet practically it will be different at different times, according to circumstances—for example, the humidity of the atmosphere in case of overhead wires. It therefore is of great advantage to provide an artificial circuit, as above stated, so as to in effect place the whole circuit to be tested within easy reach of an attendant at the central station. I preferably arrange this artificial circuit in a case and provide flexible terminals therefor, each terminal consisting of a cord and plug.

The apparatus which I use at the central station for testing to determine the neutral point in the artificial circuit and for measuring the insulation resistance consists of a Wheatstone-bridge apparatus adapted to be connected at different points or connecting sockets of the artificial circuit to determine in the first instance the neutral point, and after this point has been determined and connection made therewith to determine the actual insulation resistance. The artificial circuit is preferably provided with means for making connection with any one of several circuits emanating from the central office, so that one artificial circuit and one testing apparatus, therefore, will be sufficient for a large number of circuits supplied from the same station.

My invention is illustrated in the accompanying drawings, in which—

Figure 2:
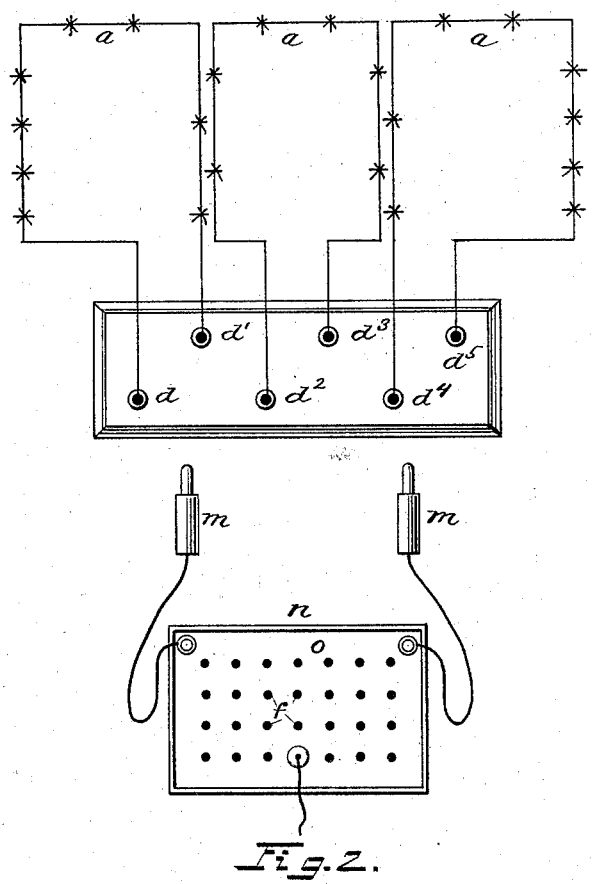
Figure 3:
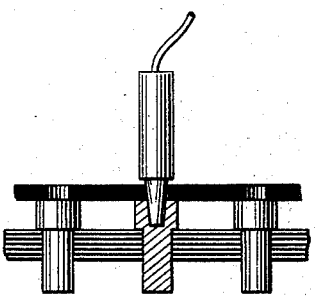

Figure 1 is a diagram of an arc-light circuit provided with the artificial circuit around the machine and the Wheatstone-bridge apparatus adapted to be connected therewith. Fig. 2 is a view of the box containing the socket connections of the artificial circuit and three pairs of socket connections of different arc-light circuits, with any one of which the artificial circuit may be connected. Fig. 3 is a detailed sectional view showing the perforated rubber plate placed over the socket connections of the resistance-circuit, the terminal plug of the Wheatstone-bridge apparatus being shown inserted through said plate into one of the said metallic sockets.

I will first describe my invention with reference to Fig. 1. The circuit $a$ may be considered as an ordinary arc-light circuit supplied from a dynamo-electric machine $b$. The artificial circuit $c$ is connected with the different sides of the dynamo at sockets $d\ d'$. The resistance of this artificial circuit should be quite high. I have used in actual practice one hundred coils of two thousand ohms each, thus making the total invariable resistance of this artificial circuit two hundred thousand ohms.

In the drawings, Fig. 1, I have shown twelve such coils, as indicated at $e'\ e^2$. When speaking generally of this resistance $e$, I shall use in my description the letter $e$ without any distinguishing mark or coefficient. These resistance-coils of the artificial circuit are so disposed in connection with sockets $f$ placed between them that connection may readily be made between any two of these coils with the Wheatstone-bridge apparatus, which I will now describe.

The bridge-circuit includes a galvanometer $g$ and a key $h$. The branch to ground includes a rheostat $i$. By means of a key $k$ the battery $l$ may be connected with the bridge. The sockets $d\ d'$ of Fig. 2 may be considered the same as the sockets of like letters in Fig. 1. Sockets $d^2\ d^3$ may be considered as a pair belonging to another circuit, while the pair $d^4\ d^5$ may be considered as belonging to a third circuit and connected in like manner, each on different sides of the dynamo-machine from which current is supplied.

As shown in Fig. 2, it will be seen that the plugs $m\ m'$, which form the terminals of the artificial circuit, are adapted to be connected with any pair of the sockets—as, for example, $d\ d'$, as shown in Fig. 1. The artificial circuit is conveniently placed in a case $n$, as shown in Fig. 2, a rubber plate $o$ being placed over the different connecting-sockets $f$ which are included between the resistance-coils of the artificial circuit. The insulating plate or dial $o$ is provided with openings, one above each of the different metallic sockets $f$, so that connection may be made therewith without danger to the attendant.

I will now describe the operation of my apparatus. We will suppose the attendant wishes to test circuit $a$. He first makes connection therewith at sockets $d\ d'$, as shown in Fig. 1. Then he closes key $h$ of the Wheatstone bridge and inserts the plug $p$ of the Wheatstone-bridge apparatus in one of the sockets $f$—for example, the socket between coils $e^6$ and $e^7$. Now if this should happen to be the neutral point the galvanometer $g$ will not be deflected; but if the galvanometer is deflected when the plug $p$ is inserted in any one of the sockets $f$ the attendant will know that the circuit is either grounded or not properly insulated. The plug $p$ is then moved from one socket $f$ to another until the galvanometer comes to zero. Now by depressing the key $k$ the battery $l$ will be connected with the circuit to charge the same. The key $k$ being still held depressed, the amount of the leak may be measured the same as if the circuit were not in active use.

Having thus described my invention, I claim as new and desire to secure by Letters Patent—

1. In an electric-light system, an artificial circuit containing high resistance of invariable amount, said artificial circuit being connected with the different sides of a dynamo-machine while supplying current to a working circuit, said artificial circuit having its resistance apportioned between connecting-sockets, in combination with a testing apparatus for determining the neutral point of said artificial circuit, substantially as and for the purpose specified.

2. An artificial circuit provided with movable terminal connections adapted to be connected with any one of several pairs of connecting devices of different active circuits, said artificial circuit having connection-sockets between the different resistance-coils thereof, said connection-sockets being covered with a plate of insulating material, openings being provided in said plate for the insertion of the plug attached to a Wheatstone-bridge galvanometer into the different connection-sockets, substantially as and for the purpose specified.

In witness whereof I hereunto subscribe my name this 30th day of October, A. D. 1889.

CHARLES H. RUDD.

Witnesses:
GEORGE N. BARTON,
GEO. R. PARKER.